(12) United States Patent
Callaway et al.

(10) Patent No.: US 7,987,135 B2
(45) Date of Patent: Jul. 26, 2011

(54) OUT OF BAND CREDIT CONTROL

(75) Inventors: Paul J. Callaway, Chicago, IL (US);
Michael E. Culhane, II, Evanston, IL (US); Sunil K. Cutinho, Park Ridge, IL (US); Frank Kmiec, Cary, IL (US); Ari Studnitzer, Chicago, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 290 days.

(21) Appl. No.: 11/841,258

(22) Filed: Aug. 20, 2007

(65) Prior Publication Data
US 2009/0055303 A1  Feb. 26, 2009

(51) Int. Cl.
*G06Q 40/00* (2006.01)
(52) U.S. Cl. ............ 705/37; 705/38; 705/36 R; 235/380
(58) Field of Classification Search .................... 705/37, 705/38, 36 R; 235/380
See application file for complete search history.

(56) References Cited

U.S. PATENT DOCUMENTS

| | | | |
|---|---|---|---|
| 4,980,826 A | 12/1990 | Wagner | |
| 6,317,727 B1 | 11/2001 | May | |
| 6,321,212 B1 | 11/2001 | Lange | |
| 6,347,307 B1 | 2/2002 | Sandhu et al. | |
| 6,405,180 B2 | 6/2002 | Tilfors et al. | |
| 6,421,653 B1 | 7/2002 | May | |
| 6,618,707 B1 | 9/2003 | Gary | |
| 6,658,393 B1 | 12/2003 | Basch et al. | |
| 6,721,715 B2 | 4/2004 | Nemzow | |
| 6,963,856 B2 | 11/2005 | Lutnick et al. | |
| 6,996,540 B1 | 2/2006 | May | |
| 7,043,457 B1 | 5/2006 | Hansen | |
| 7,130,789 B2 | 10/2006 | Glodjo et al. | |
| 7,177,833 B1 | 2/2007 | Marynowski et al. | |
| 7,194,481 B1 | 3/2007 | Van Roon | |
| 2001/0056398 A1 | 12/2001 | Scheirer | |
| 2002/0002530 A1 | 1/2002 | May | |
| 2002/0035531 A1 | 3/2002 | Push | |
| 2002/0046152 A1 | 4/2002 | Kinney et al. | |
| 2002/0077947 A1 | 6/2002 | Ward et al. | |
| 2002/0082967 A1 * | 6/2002 | Kaminsky et al. .............. 705/37 |
| 2002/0099651 A1 | 7/2002 | May | |

(Continued)

FOREIGN PATENT DOCUMENTS

CA  2 626 935  5/2007

(Continued)

OTHER PUBLICATIONS

Special Executive Report, Increase in Position Limits on CME Russell 2000® and E-Mini® Russell 2000 Contracts, 2 pages, Apr. 20, 2006, Chicago Mercantile Exchange, Inc.
Notice—Revised Position Limits in Treasury Futures During Last Ten Trading Days, Jul. 19, 2006, Paul J. Draths—Vice President & Secretary, Chicago Board of Trade, 3 pages.
Position Limit and Reportable Level Table, 3 pages, Chicago Board of Trade.

(Continued)

*Primary Examiner* — Ella Colbert
*Assistant Examiner* — Daniel L Green, Jr.
(74) *Attorney, Agent, or Firm* — Banner & Witcoff, Ltd.

(57) ABSTRACT

Systems and method for mediating risks associated with orders in an electronic trading system are provided. A front end component includes a plurality of trading engines that receive orders from traders. A back-end component includes a credit control module that communicates with the plurality of trading engines. The credit control monitors aggregate risk parameters for the trading engines and requests credits from trading engines.

23 Claims, 9 Drawing Sheets

U.S. PATENT DOCUMENTS

| | | |
|---|---|---|
| 2002/0116314 A1 | 8/2002 | Spencer et al. |
| 2002/0116317 A1 | 8/2002 | May |
| 2002/0156719 A1 | 10/2002 | Finebaum et al. |
| 2002/0169774 A1 | 11/2002 | Greenbaum et al. |
| 2002/0178102 A1 | 11/2002 | Scheinberg et al. |
| 2003/0033240 A1 | 2/2003 | Balson et al. |
| 2003/0093360 A1 | 5/2003 | May |
| 2003/0125982 A1 | 7/2003 | Ginsberg et al. |
| 2003/0220868 A1 | 11/2003 | May |
| 2003/0229571 A1 | 12/2003 | May |
| 2004/0015430 A1 | 1/2004 | May |
| 2004/0015431 A1 | 1/2004 | May |
| 2004/0172337 A1 | 9/2004 | Spoonhower et al. |
| 2004/0186806 A1 | 9/2004 | Sinclair et al. |
| 2004/0236662 A1 | 11/2004 | Korhammer et al. |
| 2004/0254804 A1 | 12/2004 | Peterffy et al. |
| 2004/0260640 A1 | 12/2004 | Crosthwaite et al. |
| 2005/0044027 A1 | 2/2005 | Rodgers et al. |
| 2005/0080703 A1 | 4/2005 | Chiesa et al. |
| 2005/0086152 A1 | 4/2005 | Sweeting |
| 2005/0097027 A1 | 5/2005 | Kavanaugh |
| 2005/0137964 A1 | 6/2005 | Nordlicht et al. |
| 2005/0171890 A1 | 8/2005 | Daley et al. |
| 2005/0171894 A1 | 8/2005 | Traynor |
| 2005/0246263 A1 | 11/2005 | Ogg et al. |
| 2005/0283422 A1 | 12/2005 | Myr |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0095363 A1 | 5/2006 | May |
| 2006/0173761 A1 | 8/2006 | Costakis |
| 2006/0190371 A1 | 8/2006 | Almgren et al. |
| 2006/0190383 A1 | 8/2006 | May |
| 2006/0265296 A1 | 11/2006 | Glinberg et al. |
| 2007/0011079 A1 | 1/2007 | May |
| 2007/0118453 A1 | 5/2007 | Bauerschmidt et al. |
| 2007/0118454 A1 | 5/2007 | Bauerschmidt et al. |
| 2007/0118455 A1 | 5/2007 | Albert et al. |
| 2007/0118456 A1 | 5/2007 | Glinberg et al. |
| 2007/0118459 A1 | 5/2007 | Bauerschmidt et al. |
| 2007/0118460 A1 | 5/2007 | Bauerschmidt et al. |
| 2007/0239591 A1 | 10/2007 | May |
| 2007/0282733 A1 | 12/2007 | May |
| 2008/0077320 A1 | 3/2008 | Loftus et al. |

FOREIGN PATENT DOCUMENTS

| | | |
|---|---|---|
| CA | 2 628 879 | 5/2007 |
| CA | 2 628 944 | 5/2007 |
| EP | 1680763 | 7/2008 |
| EP | 1949324 | 7/2008 |
| EP | 1949326 | 7/2008 |
| EP | 1949329 | 7/2008 |
| EP | 1952333 | 8/2008 |
| EP | 1952334 | 8/2008 |
| EP | 1952335 | 8/2008 |
| IN | 913/MUMNP/2008 | 5/2008 |
| IN | 940/MUMNP/2008 | 5/2008 |
| IN | 913/MUMNP/2008 | 7/2008 |
| IN | 940/MUMNP/2008 | 8/2008 |
| JP | 2008-541147 | 11/2008 |
| JP | 2008-541219 | 11/2008 |
| JP | 2008-541410 | 11/2008 |
| JP | 2009516292 | 4/2009 |
| JP | 2009516299 | 4/2009 |
| JP | 2009516878 | 4/2009 |
| WO | 2005043273 | 5/2005 |
| WO | 2007058684 | 5/2007 |
| WO | 2007061456 | 5/2007 |
| WO | 2007061617 | 5/2007 |
| WO | 2007061857 | 5/2007 |
| WO | 2007061961 | 5/2007 |
| WO | 2007061970 | 5/2007 |

OTHER PUBLICATIONS

CME EOS Trader™ Enhancements: Credit Controls, Chicago Mercantile Exchange, Inc., Mar. 25, 2007, 3 pages.

Position Limits and Position Accountability, ICE Futures U.S., Feb. 15, 2008, www.theice.com, 5 pages.

Globex® Interface Development and Testing Agreement, Chicago Mercantile Exchange, Inc., 12 pages.

Position Limit, http://www.investopedia.com/terms/p/positionlimit.asp, 1 page.

Nina Mehta, "Fast and Furious: Risk Management in a DMA Environment", Jul./Aug. 2006 Futures Industry, 3 pages.

http://www.cme.com/trading/res/reg/position.html, Position Limits/Acountability & Reportable Levels, Chicago Mercantile Exchange, Inc. 1 page.

http://rulebook.cme.com/Rulebook/utilities/allPositionLimits.html, CME Rulebook—Position Limits and Accountability for All Products, Chicago Mercantile Exchange, Inc., 40 pages.

http://www.rulebook.cme.com/Rulebook/utilities/positionLimitIndex.html, CME Rulebook—Position Limit and Position Accountability Definitions, Rules, and Levels, Chicago Mercantile Exchange, Inc., 5 pages.

http://www.cme.com/files/005.pdf, CME Rulebook, Chapter 5—Trading Qualifications and Practices, Chicago Mercantile Exchange, 63 pages.

http://www.cbot.com/cbot/pub/cont_detail/0,3206,1032+42998,00.html, Position Limits in Treasury Futures for Dec. 2006 Contracts, Chicago Board of Trade, 1 page.

http://www.cftc.gov/industryoversight/contractsandproducts/sfpspeculativelimits.html, Security Futures Products Speculative Position Limits, Jul. 26, 2007, U.S. Commodity Futures Trading Commission, 1 page.

International Search Report in related International Application No. PCT/US06/27762, dated Mar. 9, 2007.

International Search Report in related International Application No. PCT/US06/28001, dated May 7, 2007.

International Search Report in related International Application No. PCT/US06/43282, dated May 30, 2008.

International Search Report in related International Application No. PCT/US06/44702, dated Aug. 17, 2007.

International Search Report in related International Application No. PCT/US06/44917, dated Aug. 28, 2007.

International Search Report in related International Application No. PCT/US06/44932, dated Aug. 19, 2008.

International Search Report in related International Application No. PCT/US08/71452, dated Oct. 7, 2008.

International Search Report in related International Application No. PCT/IB04/52236, dated Mar. 23, 2006.

CME® Clearing Services, "Layout for Results product description [online]", Chicago Mercantile Exchange, 2005, obtained from http://web.archive.org/web/20050308181020/http://www.cme.com/clearing/rmspan/cm/reclayout1239.html, last retrieved on Feb. 22, 2007.

CME® Foreign Exchange Products, "Trading CME FX Futures: Maximizing the Opportunity for the Individual Investor," 2005, 6 pages.

CME®, "Glossary for Retail FX," obtained from http://www.cme.com/files/FXWebglossary.pdf, last retrieved on Nov. 7, 2005, 16 pages.

CME® Clearing Services, "CME and LCH product description [online]", Chicago Mercantile Exchange, 2005, obtained from http://web.archive.org/web/20050306002321/http://www.cme.com/clearing/rmspan/cm/ich1238.htm, last retrieved on Feb. 22, 2007.

International Search Report from International Application No. PCT/US08/71452 dated Oct. 7, 2008.

Position Limit, http://www.investopedia.com/terms/p/positionlimit.asp, retrieved on Jun. 10, 2010, 4 pages.

Position Limit and Reportable Level Table, 3 pages, Chicago Board of Trade, revised Mar. 2008, 4 pages.

CME Rulebook; http://www.cmegroup/rulebook/CME/1/5/, revised Apr. 2008, 55 pages.

\* cited by examiner

Variable Defined Derivative Product Order 500

502 → Account number: _____

504 → Underlying Contract: _____

506 → Expiration Month: _____

508 → Put or Call: _____

510 → Buy or Sell: _____

512 → Quantity: _____

514 → Strike Price: _____

516 → Delta: _____

518 → Gamma: _____

520 → Vega: _____

522 → Hedge Order: _____

524 → ○ Contingent

526 → ○ Best Efforts

528 → Formula

530 → ○ Standard ChgUnderlyingPrice*delta+(1/2(ChgUnderlying*gamma)^2)

532 → ○ Custom

534 → Formula: _____

536 → Variables: _____

Figure 5

OUT OF BAND CREDIT CONTROL

FIELD OF THE INVENTION

The present invention relates to credit control and risk management in a distributed derivative product trading environment. More particularly, the present invention relates to out of band credit control monitoring.

BACKGROUND

Computer systems and networks increasingly are being used to trade securities and derivative products. Computer systems and networks provide several advantages when compared to manual methods of trading. Such advantages include increased accuracy, reduced labor costs and the ability to quickly disseminate market information.

Options are frequently traded via computer systems. An option may be used to hedge risks by allowing parties to agree on a price for a purchase or sale of another instrument that will take place at a later time. One type of option is a call option. A call option gives the purchaser of the option the right, but not the obligation, to buy a particular asset either at or before a specified later time at a guaranteed price. The guaranteed price is sometimes referred to as the strike or exercise price. Another type of option is a put option. A put option gives the purchaser of the option the right, but not the obligation, to sell a particular asset at a later time at the strike price. In either instance, the seller of the call or put option can be obligated to perform the associated transactions if the purchaser chooses to exercise its option or upon the expiration of the option.

Traders typically use theoretical models to determine the prices at which they will offer to buy and sell options. The theoretical option pricing models often produce values that reflect an option's sensitivity to changes in predefined variables. These predefined variables are assigned Greek letters, such as delta, gamma and theta or other predefinitions such as vega. Delta is a measure of the rate of change in an option's theoretical value for a one-unit change in the price of the option's underlying contract. Thus, delta is the theoretical amount by which the option price can be expected to change for a change in the price of the underlying contract. As such, delta provides a local measure of the equivalent position risk of an option position with respect to a position in the underlying contract. A "50 Delta" option should change its price $50/100$, or ½ a point, for a one point move in its underlying contract.

Gamma is a measure of the rate of change in an option's delta for a one-unit change in the price of the underlying contract. Gamma expresses how much the option's delta should theoretically change for a one-unit change in the price of the underlying contract. Theta is a measure of the rate of change in an option's theoretical value for a one-unit change in time to the option's expiration date. Vega is a measure of the rate of change in an option's theoretical value for a one-unit change in the volatility of the underlying contract. Delta, gamma, and vega are the primary risk management measures used by those who trade in options.

A single option order typically identifies the underlying security or instrument, the expiration date, whether the option is a call or a put, the strike price and other standard order terms (e.g. buy/sell, quantity, account number etc.). Each time the price of the underlying contract changes or one of the variables in the trader's theoretical model changes, a trader may cancel all of the relevant orders, recalculate new order prices and transmit new order prices to the trading engine.

Computer implemented systems for trading derivative products can increase a market maker's price exposure. In the open outcry marketplace, a market maker makes markets in strikes/spreads in a serial process. As a result, the market maker may minimize the risk of having more than one of their prices acted upon simultaneously. In contrast, computer implemented systems allow market makers to provide bid/ask spreads for several strikes and spreads simultaneously. The parallel price exposure in the electronic options marketplace can pose a risk to the market maker in that they can quickly accumulate a large risk position before they can cancel/modify their resting orders. This type price exposure is known as in-flight fill risk.

Existing attempts to protect against in-flight fill risks have resulted in reduced market making participation and corresponding detrimental affects on liquidity, trading volume and price discovery.

Therefore, there is a need in the art for systems and methods for improved derivative product trading that allow traders and exchanges to protect against risk and also provide credit control.

SUMMARY

The present invention overcomes problems and limitations of the prior art by providing trading methods and systems that utilize order risk data provided by traders. The order risk data includes order risk parameters, such as maximum delta, gamma and/or vega utilization values for derivative product contracts based on the same underlying product. A match system may then limit the trader's in-flight fill risks by tracking the trader's current order risk parameter utilization state and analyzing potential trades to determine how those trades will impact the trader's order risk parameter utilization state. The match system may also limit cumulative risks by canceling orders after an order risk parameter utilization state has been exceeded.

An embodiment may include a method of processing derivative product orders at a trading engine. The method may include receiving derivative product order risk data including at least one threshold value corresponding to at least one order risk parameter. An order for a derivative product is received from a trader. As used herein "trader" includes any source for originating an order and is not limited to mean a professional trader. The derivative product order and a trader's current order risk utilization state are utilized to calculate utilization data. The derivative product order is processed in a manner determined by the derivative product order risk data and the utilization data.

An additional or alternative method of processing derivative product orders at a trading engine includes receiving derivative product order risk data including at least one threshold value corresponding to at least one order risk parameter. An order for a derivative product is received from a trader. A trader's current order risk parameter utilization value is then determined. The derivative product order is executed when the trader's current order risk parameter utilization value does not exceed the threshold value.

An additional or alternative method of managing risks associated with derivative product orders placed at a plurality of trading engines includes transmitting to a first trading engine first derivative product order risk data including at least one threshold value corresponding to at least one order risk parameter. Second derivative product order risk data including at least one threshold value corresponding to the at least one order risk parameter is transmitted to a second trading engine. A trader's current order risk utilization states at the first trading engine and at the second trading engine are determined. The determination may then be used to transmit to the first or second trading engine an offset value to adjust the order risk parameter.

A system for monitoring risks associated with orders placed at a plurality of may include a front-end having a plurality of trading engines each having an order routing mechanism and a back-end having a credit control module where the credit control module is communicable with each order routing mechanism. The credit control module determines the volume of trades from the trading engine and compares that value to the number of trades allocated for the trading engine. If the volume of trades exceeds the allocated number of trades for the trading engine, the user's orders may be cancelled. Additionally or alternatively, if the volume of trades exceeds the allocated number of trades, the credit control module may request a credit increase from another trading engine.

An additional or alternative system for monitoring risks associated with the value of orders placed at a plurality of trading engines may include a front-end having a plurality of trading engines each having an order routing mechanism and a back-end having a credit control module where the credit control module is communicable with each order routing mechanism. The credit control module verifies the credit value of the trader to determine the total value of orders placed by the trader on each individual trading engine. If the value of orders on a particular trading engine exceeds a predetermined amount of the trader credit value, the credit control module can re-route the order routing mechanism to another trading engine within the plurality.

Additional or alternative embodiments may be partially or wholly implemented on a computer-readable medium, for example, by storing computer-executable instructions or modules, or by utilizing computer readable data structures.

Of course, the methods and systems of the above-referenced embodiments may also include other additional elements, steps, computer-executable instructions or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings and from the claims.

BRIEF DESCRIPTION OF THE DRAWINGS

The out of band credit control is illustrated by way of example and not limited in the accompanying figures in which like reference numerals indicate similar elements and in which:

FIG. 5 illustrates a variable defined derivative product order in accordance with an embodiment for out of band credit control;

DETAILED DESCRIPTION

Figure 1:
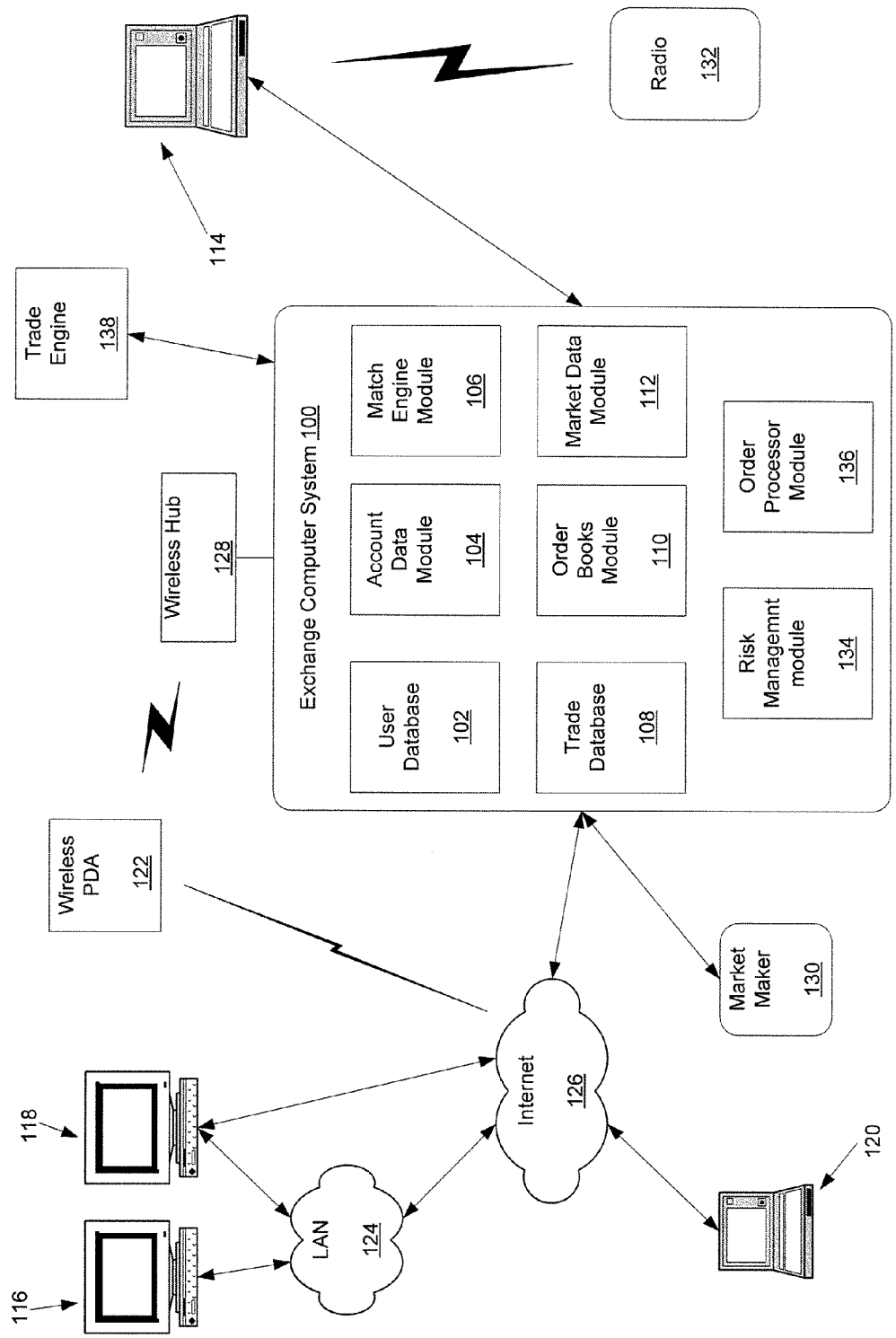
FIG. 1 shows a computer network system that may be used to implement aspects for out of band credit control.

Aspects of the present invention are preferably implemented with computing devices and networks for exchanging, transmitting communicating, administering, managing and facilitating trading information. An exemplary trading network environment for implementing trading systems and methods is shown in FIG. 1. A trading engine computer system 100 receives orders and transmits market data related to orders and trades to users. Exchange computer system 100 may be implemented with one or more mainframe, desktop, notebook, tablet PC, handheld, personal digital assistant, smartphone, servers, gateways or other computing devices. A user database 102 includes information identifying traders and other users of exchange computer system 100. Data may include user names and passwords potentially with other information to identify and/or authenticate users uniquely or collectively. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. For example, a trade database may store information, inter alia, identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose variable defined derivative product and aggregate order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on a computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
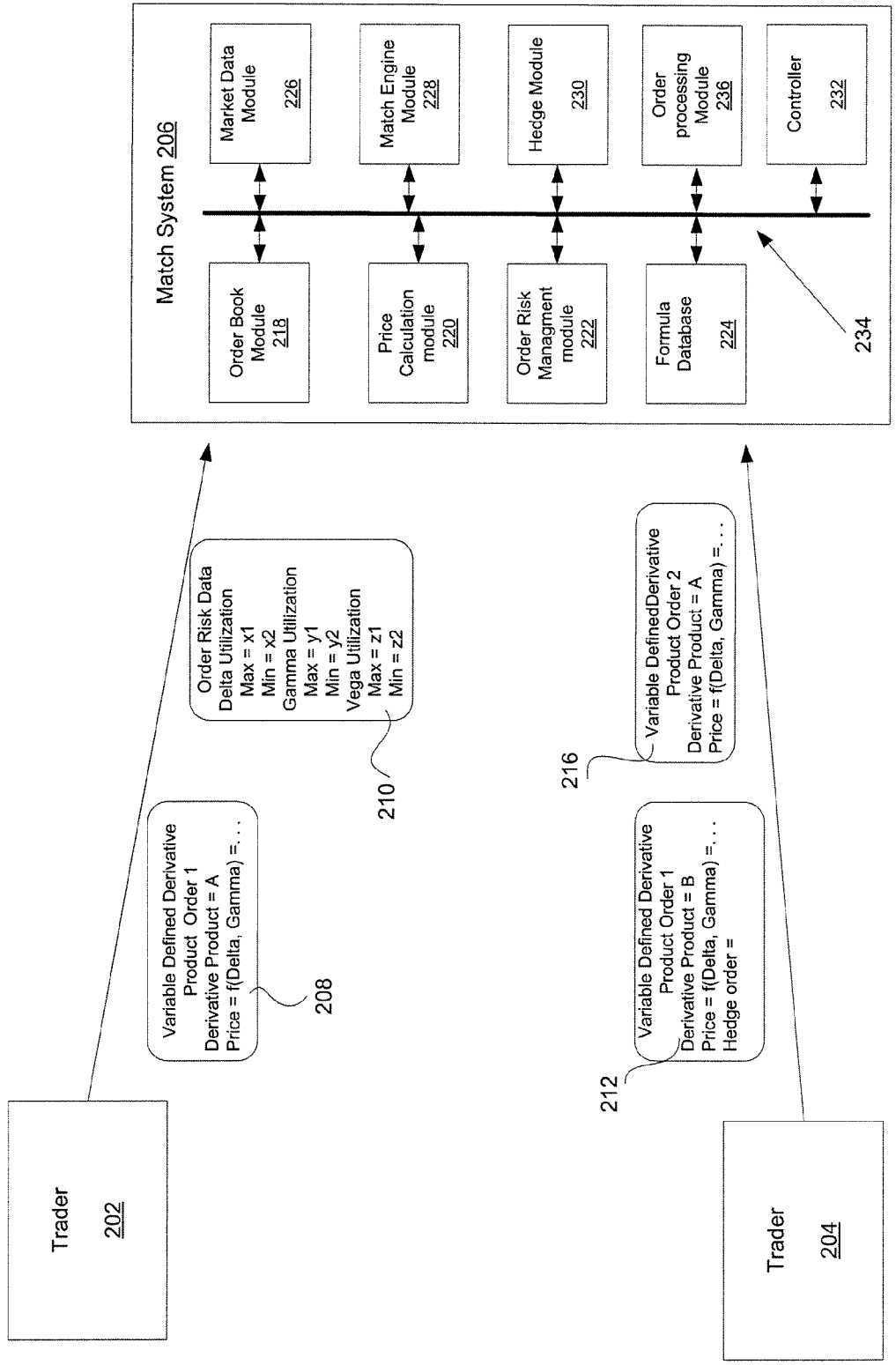
FIG. 2 illustrates a system in which traders exchange information with a match system, in accordance with an embodiment for out of band credit control.

FIG. 2 illustrates a system in which traders 202 and 204 exchange information with a match system 206, in accordance with an embodiment of the invention. Trader 202 is shown transmitting a variable defined derivative product order 208 and order risk data 210 to match system 206. Variable defined derivative product order 208 includes the identification of a derivative product and a variable order price. Variable defined derivative product orders are described in greater detail below in connection with FIG. 3. Order risk data 210 may act as a throttle to limit the number of transactions entered into by trader 202. Order risk data may include maximum and minimum values of delta, gamma and vega to utilize over a given period of time, such as a trading day. Trader 204 transmits derivative product orders 212 and 216 to match system 206. Trader may transmit several derivative product orders and may associate order risk data with one or more of the derivative product orders. As shown in order 212, one or more of the orders may include the identification of a hedge transaction.

Match system 206 may include several modules for determining prices, matching orders and executing transactions. An order book module 218 may be included to maintain a listing of current bid and offer prices. A price calculation module 220 calculates order prices based on price determination variables provided as part of variable defined derivative product orders. Price calculation module 220 may also calculate order prices based on formulas received from traders. For example, derivative product order 208 may include a formula that is a function of an underlying contract, delta and gamma. Price calculation module 220 may be configured to calculate an order price every time the price of the underlying contract changes.

Price calculation module 220 may use a default formula with price determination variable values supplied by a trader. In one embodiment, the change in a derivative product price is equal to a second order Taylor series expansion, such as:

$$\text{ChgUnderlyingPrice*delta} + (\tfrac{1}{2}(\text{ChgUnderlyingPrice}^2 \text{*gamma})) \quad (1)$$

wherein ChgUnderlyingPrice is the change in the underlying price. Trader may supply price determination variables delta and gamma and price calculation module would track the derivative product price as the underlying contract changes.

A formula database 224 may be included to store derivative product order formulas. The formulas may be provided by traders or may be standard formulas provided by an exchange. A market data module 226 may be used to collect and disseminate market data. A match engine module 228 matches bid and offer prices. Match engine module 228 may be implemented with software that executes one or more algorithms for matching bids and offers.

A hedge module 230 may be included to perform hedge transactions based on derivative product transactions. In one embodiment of the invention, hedge module 230 conducts transactions with a trading engine or match system other than match system 206. Hedge module 230 may also perform some or all of the function of risk management module 134 (shown in FIG. 1). Exemplary hedge transactions are described in detail below with references to FIGS. 6 and 7.

An order processing module 236 may be included to decompose variable defined derivative product and bulk order types for processing by order book module 218 and match engine module 228. A controller 232 may be included to control the overall operation of the components shown coupled to bus 234. Controller 232 may be implemented with a central processing unit.

An order risk management module 222 is included to limit as in-flight fill risks. For example, trader 202 provided maximum and minimum delta, gamma and vega utilization values to match system 206. Those values may be stored in order risk management module 222 and tracked and computed before executing transactions.

Figure 3:
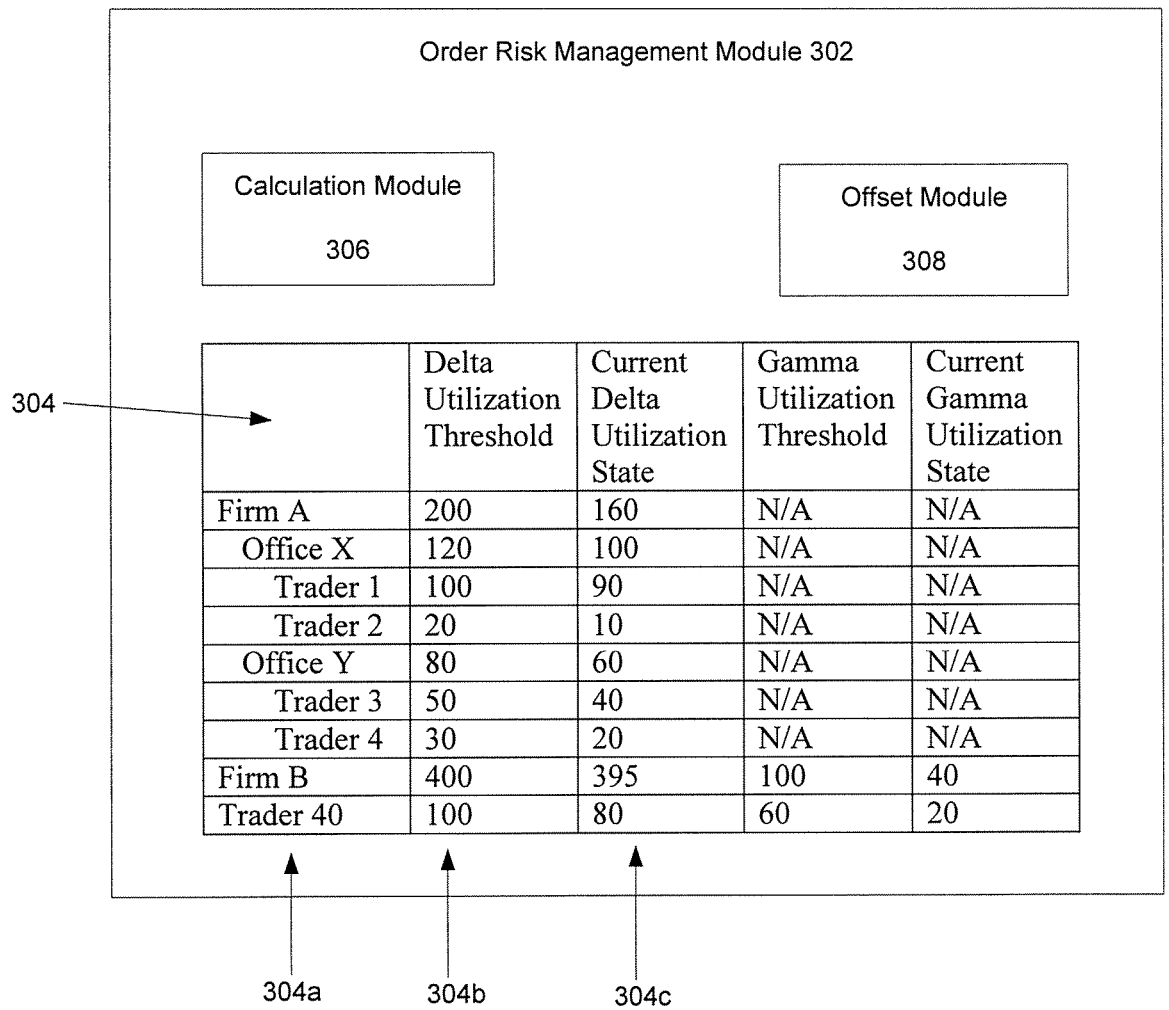
FIG. 3 illustrates an order risk management module in accordance with an embodiment for out of band credit control.

FIG. 3 illustrates an order risk management module 302 in accordance with an embodiment of the invention. A database 304 stores order risk parameter settings. Column 304b, for example, includes delta utilization threshold values. Delta utilization threshold values may be included in order risk data 210 that is transmitted from trader 202 to match system 206. Database 304 may also include the current state of order risk parameters. Column 304c, for example, includes the current delta utilization state for the entities listed in column 304a. The current utilization state of an order risk parameter is calculated by adding together the utilization values of the order risk parameter from previous trades. For example, if a trader is involved in two trades having individual delta utilization values of +45 and +60, after the second trade is executed, the trader's delta utilization state would be equal to +105.

Database 304 shows an embodiment in which several levels of order risk parameters may be used. For example, firm A has offices X and Y and employs traders 1-4. Trader 1 is obligated to comply with the order risk parameters for himself, office X and firm A. Providing order risk parameter settings in a hierarchal manner allows entities to allocate risks among subordinate entities.

Order risk management module 302 may also include a calculation module 306 for calculate order risk parameter values. An offset module 308 may be used to process offset values received from traders. An offset value may be used to provide an adjustment to an order risk parameter threshold value. For example, firm A can increase its delta utilization threshold to 220 by providing an offset value of 20. In one embodiment of the invention, an entity may allow subordinate entities to provide offset values and place limits on the use of offsets. Match system 206 may also be configured to regulate the use of offsets.

Figure 4:
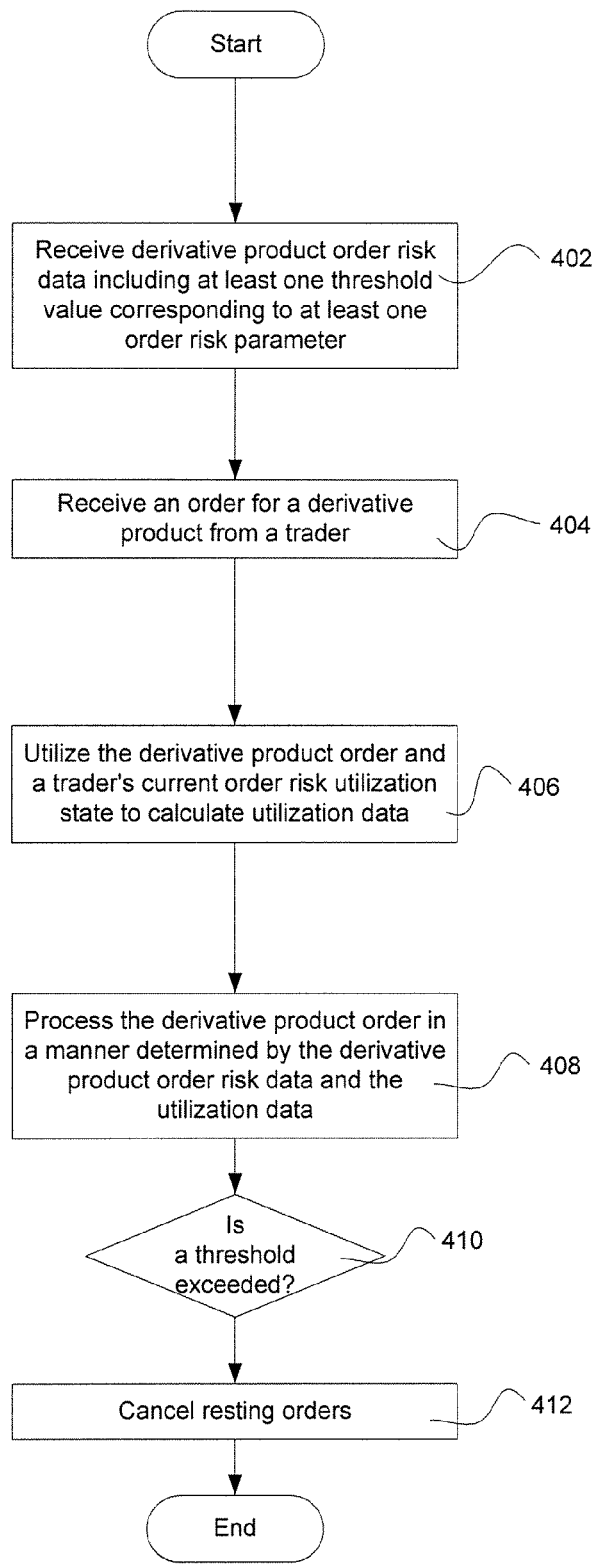
FIG. 4 illustrates a method of processing derivative product orders at a trading engine, in accordance with an embodiment for out of band credit control.

FIG. 4 illustrates a method of processing derivative product orders at a trading engine, in accordance with an embodiment of the invention. In step 402 a matching system receives derivative product order risk data including at least one threshold value corresponding to lease one order risk parameter. Step 402 may include receiving order risk data 210. Next, the match system receives an order for a derivative product from a trader in step 404. Step 404 may include receiving a variable defined derivative product order, as has been described above. In step 406, the match system utilizes the derivative product order and a trader's current order risk utilization state to calculate utilization data. In some embodiments, step 406 may include applying the utilization of a hedge transaction that accompanies a derivative product order so that the utilization data accounts for the hedge transaction. Of course, when the trader is a subordinate entity, step 406 may include utilizing the current order risk utilization state of one or more additional entities. For example, with respect to FIG. 3, when analyzing trader 1's current utilization state, the utilization states of office X and firm A should also be analyzed. This is because trader 1 may be below his utilization threshold, but office X or firm A may be over the relevant utilization threshold.

In step 408 the derivative product order is processed in a manner determined by the derivative product order risk data and the utilization data. If the execution of the trade would not cause the resulting utilization data to exceed the relevant utilization threshold, the trade is executed. There are several alternatives for treating orders that would cause the utilization data to exceed a relevant utilization threshold value. In a first embodiment, a portion of the derivative product order is executed. The portion includes the maximum number of contracts that do not cause the utilization data to exceed the threshold value. In an additional or alternative embodiment, a portion of the order that includes the minimum number of contracts that cause the utilization data to exceed the threshold value is executed. In still an additional or alternative embodiment, the entire order is fully actionable, even if filling the smallest portion of the order exceeds the risk limits. For example, if four contracts would not cause the utilization data to exceed the threshold value and five contracts would, five contracts are executed. Of course other embodiments may involve other trading units. For example, if a contract is typically traded in units of 100 contracts, each group of 100 contracts would be treated as a trading unit and treated like the individual contracts discussed above.

In an additional or alternative embodiment an entire order is canceled if the order would result in a trader's order risk utilization state exceeding the threshold value after the trade is executed. For example, if the execution of an order for five contracts would cause the threshold value to be exceeded, no contracts are executed. Additionally or alternatively, a derivative product order is executed as long as a trader's current order risk utilization state (before execution of the order) does not exceed the threshold value.

In step 410 it is determined whether the trader's order risk utilization state exceeds a threshold value. When a threshold has been exceeded, some or all of the trader's resting orders may be cancelled in step 412. In various embodiments all resting orders or all resting orders within an option class are cancelled. Additionally or alternatively, all risk-increasing orders may be cancelled. For example, if a positive delta limit has been exceeded, then all call bids and put offers are cancelled. If a negative delta limit has been exceeded, then all call offers and put bids are cancelled. If a positive gamma limit has been exceeded, then all call and put bids are cancelled. Likewise, if a negative gamma limit has been exceeded, all call and put offers are cancelled.

Returning to FIG. 2, match system 206 may include modules that perform some or all of the functions of the modules shown in FIG. 1. Moreover, match system 206 may also be coupled to some or all of the elements shown in FIG. 1. Match system 206 may also be configured to transmit warning messages to traders alerting them of order risk utilization states. Match system 206 may also include or be coupled to an interface that allows traders to check current order risk utilization states via the Internet, another network, telephone, etc.

FIG. 5 illustrates a variable defined derivative product order 500 in accordance with an embodiment of the invention. Variable defined derivative product order 500 may include a field 502 for identifying a trader's account number. The underlying contract may be identified in field 504. The expiration month of the derivative product order may be identified in field 506. The order may be identified as a put or a call in field 508 and whether the order is a buy or sell in field 510. The quantity may be identified in field 512 and the strike price may be identified in field 514. Delta, gamma, and vega values may be identified in fields 516, 518 and 520 respectively. Of course, other price determination variables may also be identified as part of a standard variable defined derivative product order.

A hedge transaction may be identified in field 522. The user may choose to make the derivative product order contingent on the existence of an available hedge transaction by selecting radio button 524. The user may also choose to use best efforts to fill the hedge order after the execution of the derivative product order by selecting radio button 526.

The formula for calculating the price of variable defined derivative product order is identified in field 528. The trader can select a standard formula 530 to compute their derivative product price or select a custom formula 532. In one embodiment, a standard formula is supplied by or sponsored by an exchange. When a custom formula is selected, the trader may also provide a formula in field 534 and the variables in field 536. In one implementation of the invention, variable defined derivative product order 500 is created in the form of an XML for HTML document created by one of the computer devices shown in FIG. 1. Variable defined derivative product order 500 may be encrypted before being transmitted to a trading engine. Of course one or more additional or alternative fields may be included. For example, a reference price may be included to protect against mispricing conditions.

Figure 6:
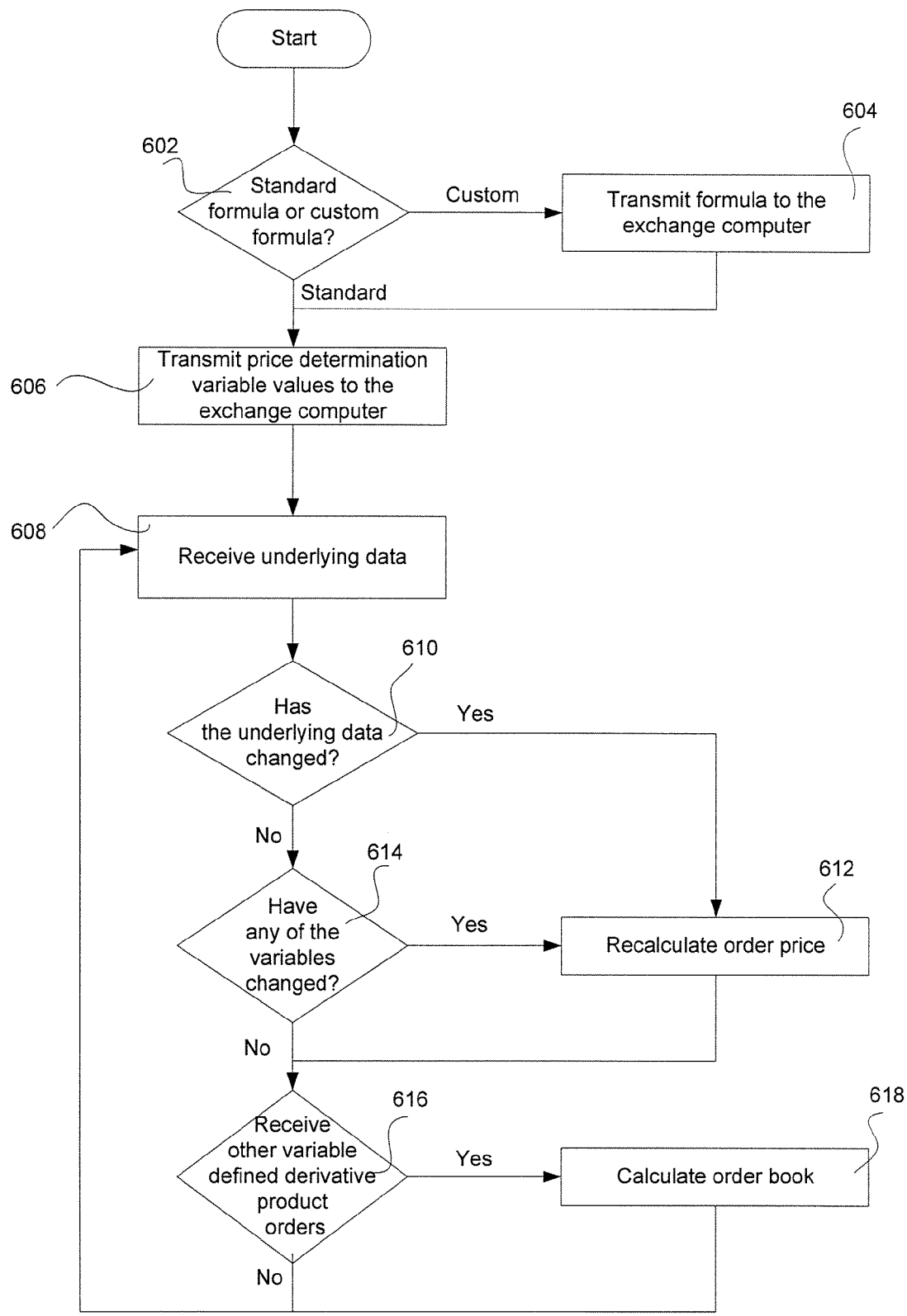
FIG. 6 illustrates a method of processing variable defined derivative product orders by a trading engine computer, in accordance with an embodiment for out of band credit control.

FIG. 6 illustrates a computer-implemented method of trading a derivative product contract that involves the use of a variable order price, in accordance with an embodiment of the invention. First, in step 602 it is determined whether the trader desires to use a standard exchange sponsored formula. When the trader uses a custom formula, the formula is transmitted to the exchange computer in step 604. Step 604 may also include the trader or exchange transmitting the formula to other market participants. In step 606, the trader transmits price determination variable values for the standard formula to an exchange computer. For example, step 606 may include transmitting delta and gamma values to an exchange computer. Step 606 may also include transmitting a formula and price determination variables to other computers so that other computers may calculate an order book. Additionally or alternatively, the exchange computer may distribute all formulas and price determination variables to user computers. In step 608 the trader receives underlying data. The underlying data may include current bid and offer prices for underlying put and call futures contracts.

In step 610 it is determined whether the underlying data has changed. The price of an underlying contract may change multiple times per second. When the underlying contract data has changed, in step 612 the trader's computer device may recalculate the order price of their variable defined derivative product order and all other variable defined derivative product orders from other users based on current data. In step 614, it is determined whether any of the price determination variables used in the formula to calculate the order price have changed. The price determination variables may include delta, gamma, and vega. When the price determination variables have changed, in step 612, the order price is recalculated. Of course, step 612 may be performed based on changes in current underlying contract data and variables. The order price may be displayed to the trader or plotted on a graph that tracks order prices.

A trading engine computer or match system may transmit a plurality of variable defined derivative product orders to several different traders only when other derivative product order users establish their initial positions. The exchange computer may then transmit underlying data or other data used to calculate variable defined derivative product order prices. Each trader computer may periodically calculate current order prices based on information received from the exchange computer. For example, in step 616 it is determined whether other variable defined derivative product orders are received. When variable defined derivative product orders are received, in step 618 the trader computer may calculate new order book listings for current bids and offers related to variable defined derivative product based orders. The order book may be displayed to the trader in any one of a variety of conventional formats. After step 618, control returns to step 608.

Figure 7:
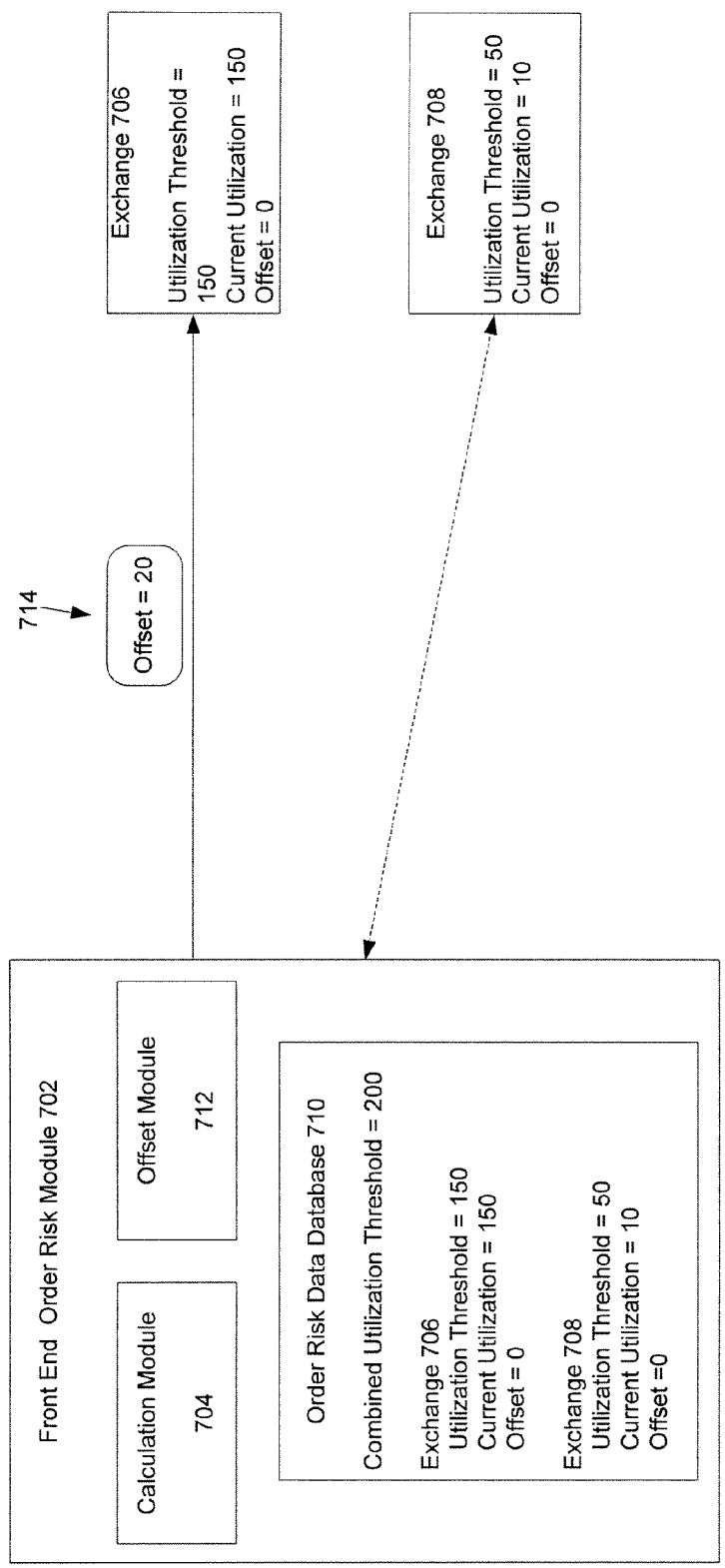
FIG. 7 illustrates a front-end system that may be used to manage risks associated with derivative product orders placed at a plurality of trading engines.

FIG. 7 illustrates a front-end system that may be used to manage risks associated with derivative product orders placed at a plurality of exchanges, in accordance with an embodiment of the invention. A front-end order risk module 702 may reside on a terminal connected to one or more trading engines via a network, such as the Internet. Front-end order risk module 702 may comprise a portion of a software application that allows traders to interact with trading engines. A calculation module 704 functions in a manner similar to calculation module 306. Front-end order risk module 702 allows traders to manage risks associated with resting orders placed at a plurality of trading engines. For example, the trader may provide order risk data to trading engines 706 and 708. An order risk data database 710 may be included to calculate and track order risk data that has been provided to trading engine 706 and trading engine 708.

An offset module 712 may be used to distribute risks among two or more trading engines. For example, the current utilization of an order risk parameter at trading engine 706 is equal to the utilization threshold. As a result, no additional contracts will be executed at trading engine 706. However, the current utilization of the order risk parameter at trading engine 708 is below the utilization threshold. Based on this information, offset module 712 may transmit offset value 714 to trading engine 706 to allow trading engine 706 to execute additional contracts. The use of offset 714 allows the trader to continue conducting transactions while ensuring that the combined utilization threshold is not exceeded. The front-end order risk module 702 may prompt the trader to enter offset values. Additionally or alternatively, offset module 712 includes computer-executable instructions that generate offset values to transmit to trading engines based on the current utilization at the relevant trading engines.

In a distributed trading environment, there is a "many-to-many" relationship between the number of traders and the number of trading engines being traded on. Each trading engine has a particular capacity of trades that it is able to process, depending on a number of factors, including space and connectivity. In this relationship, there is a routing mechanism to deliver trades to the correct engine, but there is typically limited to no communication between engines to confirm what the trader may be doing in other markets and utilizing other trading engines. It is also contemplated, however, that the individual trading engines are not required to check with the credit control module to determine that the user does not exceed the user's available credit. In this way, credit aggregation may be performed out-of-band, with communication back to each of the trading engines that allow for enforcement of controls in-line to the trading activity. Thus, each trading engine may act on its own to determine whether the trader is engaging in proper trading activity. Additionally or alternatively, each of the trading engines may communicate with each other utilizing another module (besides the credit control module) to make determinations as to the trading activity.

Embodiments in accordance with the present invention provide credit control monitoring across any number of engine instances without adding or introducing significant performance or scalability limitations. A credit control module may provide asynchronous monitoring and management of credit controls with communication back to the order routing mechanism or trading engine to confirm current thresholds, any credit control events or other in-line controls.

Credit control events include events that are related to risk parameters and can be asynchronous or in line. Credit control events may include characteristics associated with an order, such as contract terms, number of trades, types of options, number of contracts, time order is placed, value of order and so on. Credit control events may also include characteristics associated with derivative risk parameters, such as delta, gamma and vega. In addition, credit control events may be based on properties of the contract, for example, a short term versus a long term contract. It is contemplated that credit control events can be based on any of the above or any combination of the above. It is further contemplated that a credit control module in accordance with the present invention may provide other in-line controls, such as the delta value of the aggregate trading.

Credit control events may include gross or net risk parameters and limits therein. For example, there are those orders which may add risk to a trader's portfolio or subtract risk from the trader's portfolio. A trader's gross trading may be calculated by aggregating the number of contracts. If a trader were to place five different orders for five contracts each, the gross of the trader would be twenty-five. In contrast, it is contemplated that certain orders may subtract risk from the gross amount. If a trader were to place two different orders to buy five contracts and two different orders to sell five contracts (assuming that a sell order in this instance reduces risk), the trader's net risk parameter would be zero. Along these lines, the credit control events may be based off of other notional values, such as positions held or a profit versus loss analysis of a portfolio. By measuring these notional values, the overall risk parameter of the portfolio or the profit/loss of a position can be evaluated. Thus, it is contemplated that the risk parameters for use with the present invention can be customized for each trader or trading engine.

In an asynchronous credit control, extensions are provided to provide limited in-line processing in the order routing mechanism or trading engine. Preferably, a maximum quantity definition is managed in the credit control component and communicated back to the order routing mechanism and trading engine components. The maximum quantity definition can be set to a maximum allowable credit value and is preferably modifiable by a firm or credit control module in order to reduce the maximum quantity that can be traded as the credit control limit is approached. As explained herein, it is contemplated that the maximum quantity definition is also applicable to the in-line credit control.

It is contemplated that once a pre-determined capacity of trading has been reached, the credit control module may cancel any risk increasing or remaining orders. Additionally or alternatively, once a pre-determined capacity of trading has been reached, the credit control module may request an increase in credit available from the order routing mechanism of one trading engine to the order routing mechanism of a second trading engine. In this way the credit control module manages the number of trades to ensure that the maximum allowable credit value is not exceeded. Furthermore, it is contemplated that the limiting or canceling of orders may be accomplished in the direction of the risk, so as to minimize risk where possible.

As explained herein, each trader has associated with that trader a specific amount of credit. It is contemplated that as used herein, the term trader applies to individuals, brokerage houses and other investment firms as well as computer generated orders or automated orders. It is contemplated that the term a trader as used herein can be any source that originates an order.

Figure 8:
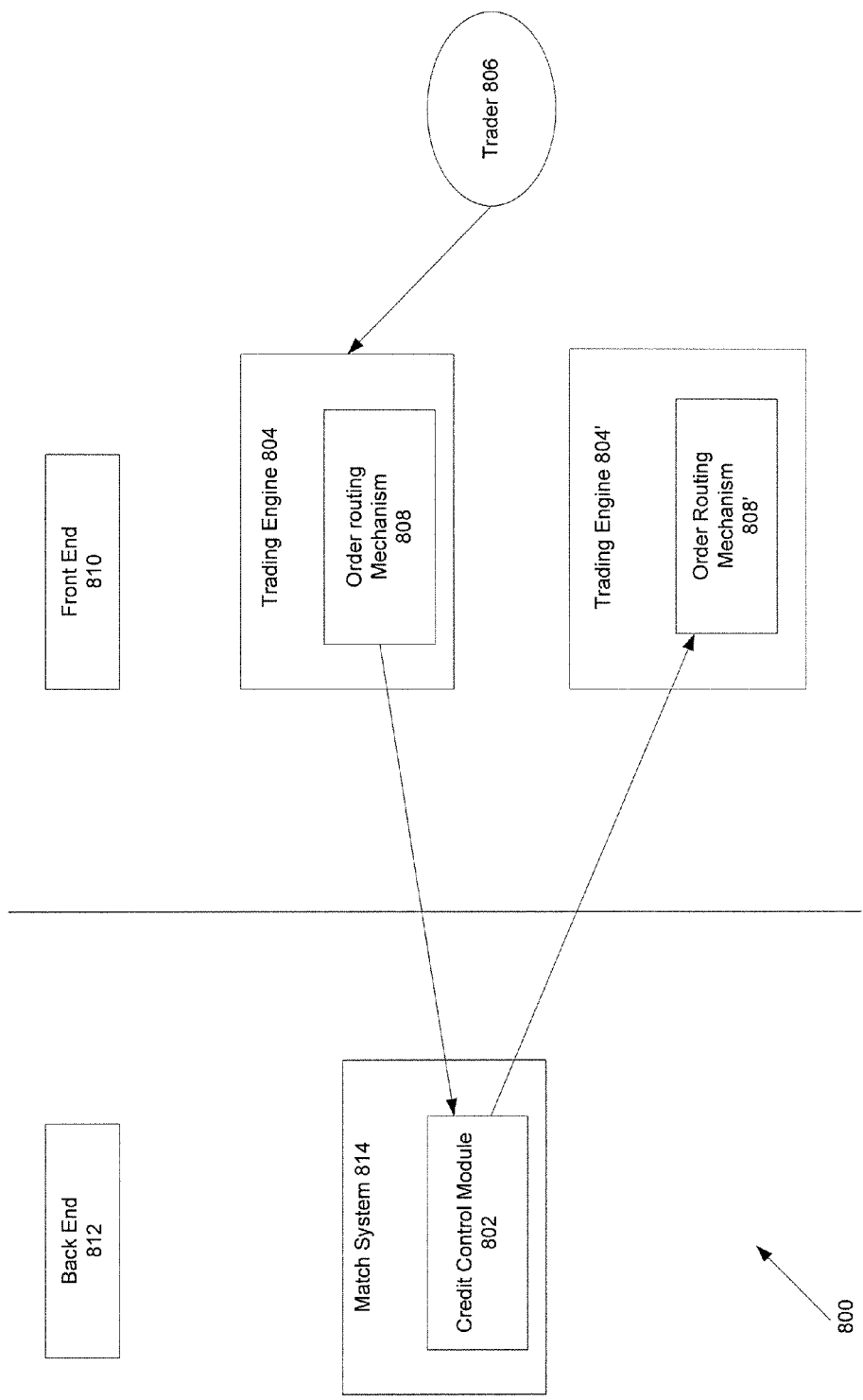
FIG. 8 illustrates a system used to manage risks associated with the volume of derivative product orders placed at a plurality of trading engines.

As shown in FIG. 8, an asynchronous embodiment in accordance with the teachings of the present invention is shown. In the asynchronous system 800, the credit control module 802 monitors the current thresholds. The threshold may be monitored to ensure that a maximum number of orders and trades is not exceeded by a trading engine 804. It is contemplated that the credit control module 802 may be located on the front end, the back end or a combination of the two. In one embodiment, the trading engine 804 is on the front end 810 and the credit control module 802 is on the back end 812. It is further contemplated that the credit control module 802 is a unitary part of the match system 814. For example, the credit control module 802 may be a part of the match system 814 to process the trade order that is placed. A trader 806 places a trade through the trading engine 804, which relays the trade to the order routing mechanism 808. The order routing mechanism 808 communicates with the credit control module 802 and relays information regarding the trader 806 and identifies which trading engine 804 the trade is being placed through.

Each trading engine 804 also preferably includes information that is associated with that trading engine 804. For example, each trading engine 804 may include information about the location of the engine, the trading history of the engine, an index of derivative products traded, a trading volume capacity, etc. The trading engine 804 may include information regarding the maximum number of trades, or trading capacity, that the engine is capable of handling. This information can be communicated to the credit control module 802 through the order routing mechanism 808 at anytime during the process of placing the trade: before, during or after. The credit control module 802 may determine the number and value of trades each trading engine 804 is attempting to place while the trades are being placed. At the same time, the credit control module 802 is communicating with the order routing mechanism 808 and may determine the trading volume capacity of the trading engine 804.

If the number and/or value of trades being placed through the order routing mechanism 808 exceeds the maximum trading volume capacity, the credit control module 802 can request a credit increase for the trades from another trading engine 804' via another order routing mechanism 808'. It is contemplated that the credit control module 802 will begin to request an increase in credit from another trading engine once a certain percentage of the maximum trading volume is being approached. In one example, if the amount of trades reaches 98% of the maximum trading volume of the trading engine 804, the credit control module 802 will begin to request credit from the order routing mechanism 808 of one trading engine 804 to the order routing mechanism 808' of a another trading engine 804'. Those of ordinary skill would appreciate the pre-determined level to begin requesting credit from one trading engine to another.

Additionally or alternatively, when the credit control module 802 requests a credit increase to a second trading engine due to the over-capacity of a first trading engine, the maximum trading value capacity of the second trading engine is checked. Should the second trading engine also be at a pre-determined level of the maximum trading value of the second trading engine, the credit control module 802 may request an increase in credit from a third trading engine. It is contemplated that each trading engine may have different maximum trading value capacities, although some or all may have the same. In this way, the credit control module 802 will continue to request a credit increase from a first trading engine until a trading engine is reached that is not at the pre-determined level of maximum trading value capacity and then the trade can be placed through the order routing mechanism of that trading engine.

In another embodiment in accordance with the present invention, a credit control module provides monitoring and management of credit controls with communication to each trading engine to act as a bank to manage the available credit. In this way, the credit controls can be managed in-line with the credit control module, which can manage where to add or subtract credit.

Figure 9:
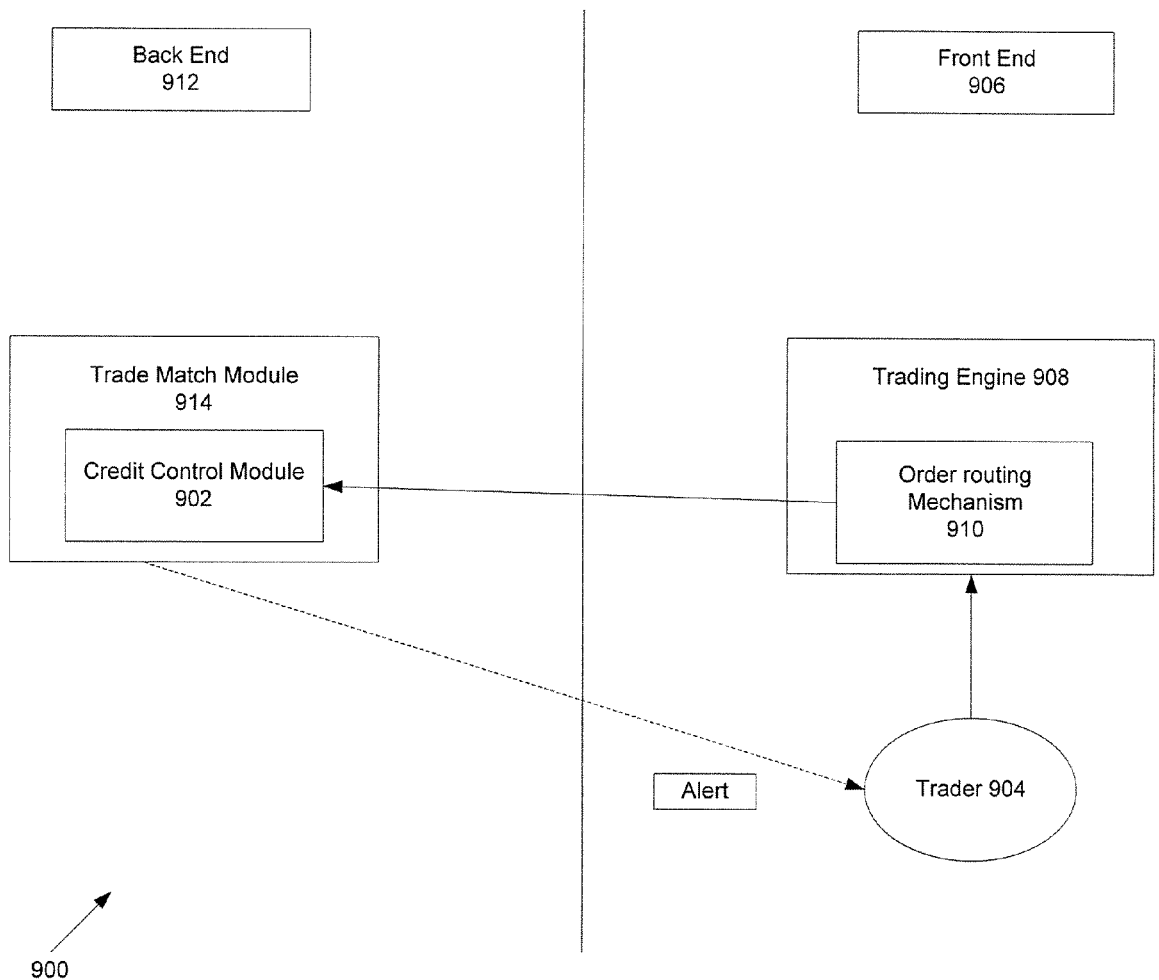
FIG. 9 illustrates a system used to manage risks associated with the credit of a trader placing derivative product orders at a plurality of trading engines.

As shown in FIG. 9, an embodiment illustrating how a credit control module can provide monitoring and management to act as a bank to manage available credit is provided. This embodiment of the invention shows a banking system 900 wherein the credit control module 902 monitors and manages the credit capacity of a trader 904. The trader 904 places a desired trade order on the front-end 906 of the system. In particular, the trader 904 interacts with a trading engine 908 to place a desired trade. The trade information for the desired trade is then sent to the order routing mechanism 910, which in turn communicates the trade information from the front-end 906 to the back-end 912, and more particularly, to the trade match module 914. The trade information is sent to the trade match module 914 through the credit control module 902. In this way, the trade is not placed into the trade match module 914 until acceptance from the credit control module 902.

Each trader 904 has associated with it trader information. Included in the trader information is a total credit parameter which may include a maximum credit value. Once the order is sent from the trader 904 on the front-end 906, the credit control module 902 reviews the maximum credit value for the trader 904. If the value of the desired trade being placed is less than the maximum credit value associated with the trader, the credit control module 902 will allow the trade to proceed to the trade match module 914 for execution. If, on the other hand, the value of the desired trade being placed is greater than the maximum credit value associated with the trader 904, then the credit control module 902 can stop the trade from execution by not allowing the trade to proceed to the trade match module 914.

In addition, the credit control module 902 can stop a particular trade from being executed if it is approaching the traders 904 maximum credit value. If the trader 904 has attained a certain (typically predetermined) percentage of his/her maximum credit value, the credit control module 902 can stop the trade from being executed. Alternatively, the credit control module 902 can send an alert to the trader 904, informing the trader 904 that the maximum credit value is approaching. Still alternatively, the credit control module 904 may do any combination of allowing the trade to proceed to the trade match module 914, halting the trade and alerting the trader.

The credit control module may also or alternatively monitor the number of trades of each trading engine and also act as a bank and manage the credit of a trader, as described above. In certain embodiments, if a trader places a trade through the trading engine, the credit control module will check to make sure that trader has enough available credit to make the trade and also that the trading engine has the capacity to fill the requested volume of the trade. If the trader has enough credit but the trading engine does not have the volume capacity, the credit control module requests a credit increase for the trading engine by requesting a credit increase from the available credit of another trading engine as described above.

Embodiments of the present invention can be extended for any market, future, option, forward or other financial instrument or investment vehicle with a defined set of weights or conversion rules to compare all traded contracts against a set of user defined values. It is contemplated that financial instruments and investment vehicles herein are interrelated. For example, it is contemplated that a trader may trade a future, followed by an option on that future. Such a position is known as hedging. Alternatively and additionally, it is contemplated that traders may use equities and currency in a risk offsetting manner as would be appreciated by those in the art. Other examples include incidents such as a stock and an index. These values can be defined statically or can be defined dynamically on a relative basis for time or even volatility. This can also be applied with a user defined set of models or relationships between contracts or asset clauses.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. For example, aspects of the invention are not limit to implementations that involve the trading of derivative products. Those skilled in the art will appreciate that aspects of the invention may be used in other markets. Credit market transactions, for example, involve risk parameters in the form of duration risk and default risks. The processing of appropriate orders in credit markets may include analyzing duration risk utilization and default risk utilization.

What is claimed is:

1. A system for monitoring risks associated with orders placed at a plurality of trading engines, the system comprising:
   a front-end having a plurality of trading engines, each trading engine including an order routing mechanism, the front-end being characterized by a quantity definition including a total credit parameter, the total credit parameter associated with a maximum aggregate risk parameter for the trading engine;
   a back-end having at least one credit control module communicable with the plurality of trading engines, the credit control module receiving orders and communicating the quantity definition of each trading engine to determine the value of orders placed on each trading engine; wherein when the value of orders exceeds a predetermined amount of a quantity definition for a first trading engine, the credit control module requests an increase in credit from the order routing mechanism of a second trading engine within the plurality of trading engines.

2. The system of claim 1 where the quantity definition comprises a credit parameter.

3. The system of claim 2 where the credit control module evaluates the credit parameter.

4. The system of claim 3 where the credit control module evaluates the credit parameter through the order routing mechanism.

5. The system of claim 4 where the placed order is executed in response to a determination that the credit parameter is safe.

6. The system of claim 4 where the placed order is canceled in response to a determination that the credit parameter is over.

7. The system of claim 4 where the first trading engine requests an increase in credit from the second trading engine in response to a determination that the credit parameter is approaching.

8. The system of claim 7 where the credit control module determines the quantity definition of the second trading engine.

9. The system of claim 8 where the second trading engine transfers credit for the execution of the placed order at the first trading engine in response to a determination that the credit parameter for the second trading engine is safe.

10. The system of claim 8 where the second trading engine cancels the placed order at the first trading engine in response to a determination that the credit parameter for the second trading engine is over.

11. The system of claim 8 where the second trading engine requests a credit increase from a third trading engine in response to a determination that the credit parameter for the second trading engine is approaching.

12. The system of claim 8 where when the credit parameter for the third trading engine is over, the credit control module requests a credit increase utilizing the order routing mechanism of the third trading engine to a next trading engine within the plurality until a trading engine is located where the credit parameter is not over.

13. A method of managing credit associated with derivative product orders placed at a plurality of trading engines, the method comprising:

transmitting an order from a trader to a back-end server for execution; where the order originates from the trader through an order routing mechanism on the trading engine;

receiving the order by a credit control module located in the back-end server; where each of the plurality of trading engines transmits all orders through each respective order routing mechanism on each trading engine to the credit control module;

determining, by the credit control module, an aggregate risk parameter for each trading engine; where the aggregate risk parameter includes a total credit parameter, where said total credit parameter is the maximum value of orders that can be placed through that trading engine;

assessing the value of orders placed at each trading engine; and comparing the value of orders placed at each trading engine with the aggregate risk parameter for each trading engine; when the value of orders being placed at each trading engine is less than the aggregate risk parameter for that trading engine, each order is executed; further when the value of orders being placed at a trading engine is greater than the aggregate risk parameter for that trading engine, each order is canceled; and further when the value of orders being placed at a trading engine is approaching the aggregate risk parameter for that trading engine, a request for a credit increase is made to another trading engine with an appropriate aggregate risk parameter.

14. The method of claim 13 where the aggregate risk parameter also includes a maximum allowable credit value for each trader for all of the plurality of trading engines.

15. The method of claim 14 where the credit control module determines the total value of orders being placed by a trader for all of the plurality of trading engines.

16. The method of claim 15 where the credit control module compares the value of the total number of orders for each trader with the maximum credit value for that trader; when the value of orders being placed by the trader at all trading engines is less than the maximum credit value for that trader, each order is executed; further when the value of orders being placed at each trading engine is greater than the maximum credit value for that trader, each order is canceled; and further when the value of orders being placed at a trading engine is approaching the maximum credit value for that trader, additional credit value is requested from another trading engine.

17. The method of claim 13 where the value of orders is approaching the aggregate risk parameter when a predetermined value of orders of the aggregate risk parameter is reached.

18. A method for managing credit associated with at least one order placed by a trader at a plurality of trading engines, the method comprising:

placing at least one order through a trading engine; where the trading engine includes an aggregate risk parameter having a total credit value maximum;

verifying the trader has a total credit value less than the aggregate risk parameter for the trading engine; and requesting, by a credit control module, a credit value increase for the trading engine from a second trading engine when the trader's total credit value is more than the aggregate risk parameter for the trading engine.

19. The method of claim 18 where as the total credit value of the trader approaches the aggregate risk parameter, a risk security measure is implemented.

20. The method of claim 19 where the risk security measure is selected from one or more of cancelling the order; requesting a credit value increase; notifying the trader; executing the order and executing a portion of the order.

21. The system of claim 1, wherein the plurality of trading engines are configured to receive orders for derivative products.

22. The method of claim 13, wherein the order comprises a derivative product order.

23. The method of claim 18, wherein the at least one order comprises a derivative product order.

\* \* \* \* \*